United States Patent
Lloyd

(10) Patent No.: US 6,460,041 B2
(45) Date of Patent: Oct. 1, 2002

(54) BROWSER-BASED DATABASE-ACCESS ENGINE APPARATUS AND METHOD

(75) Inventor: Steven D. Lloyd, Pleasant Grove, UT (US)

(73) Assignee: Inshift Technologies, Inc., Provo, UT (US)

( * ) Notice: Subject to any disclaimer, the term of this patent is extended or adjusted under 35 U.S.C. 154(b) by 0 days.

(21) Appl. No.: 09/843,331

(22) Filed: Apr. 25, 2001

Related U.S. Application Data

(60) Provisional application No. 60/199,850, filed on Apr. 26, 2000.

(51) Int. Cl.[7] .............................................. G06F 17/30
(52) U.S. Cl. ................................ 707/10; 707/2; 707/3; 707/4
(58) Field of Search ................................. 707/4, 3, 2

(56) References Cited

U.S. PATENT DOCUMENTS

| | | | |
|---|---|---|---|
| 5,987,454 A | * 11/1999 | Hobbs | 707/4 |
| 6,012,067 A | * 1/2000 | Sarkar | 707/103 |
| 6,016,394 A | 1/2000 | Walker | 707/1 |
| 6,038,566 A | * 3/2000 | Tsai | 707/102 |
| 6,131,096 A | 10/2000 | Ng et al. | 707/10 |

* cited by examiner

*Primary Examiner*—Diane D. Mizrahi
(74) *Attorney, Agent, or Firm*—Pate Pierce & Baird

(57) ABSTRACT

A method and apparatus are herein described for a browser-based, database-access engine. Access to and modification of database data and schema are made available to a user remotely through a network, such as the Internet. The system is configured to interpret special tags embedded within HTML encoded web pages. The special tags may be configured to be interpreted into SQL in order to communicate with an SQL compliant database, or the special tags may be configured to be interpreted to any other database language. The special tags may also be configured to embed and/or introduce logic into HTML encoded web pages. The system may coordinate the functioning of a browser application, web server, and database all on one computing machine or each may be located on different computing machines connected by the Internet at opposite sides of the globe. Advantages of the present invention include the capability for remote database management and the ability to maintain and modify a web site from any remote Internet-connected location. Thus, the system makes a simple Browser application connected to the Internet a convenient database management tool.

19 Claims, 8 Drawing Sheets

BROWSER-BASED DATABASE-ACCESS ENGINE APPARATUS AND METHOD

BACKGROUND

1. Related Applications

This application is a continuation of and claims priority to provisional application Serial No. 60/199,850, filed on Apr. 26, 2000, directed to a BROWSER-BASED, DATABASE-ACCESS ENGINE APPARATUS AND METHOD, which is incorporated herein by reference.

2. The Field of the Invention

This invention relates to computer software and, more particularly, to novel systems and methods for accessing databases through computer networks including without limitation local area networks, wide area networks, and global networks.

3. The Background Art

Databases are very useful and powerful. Likewise, database management systems and engines for accessing databases abound. Unfortunately, many database management systems require a cadre of management information systems personnel and often programmers and computer gurus to make the data useful and available to users. Of course, these human resources do not come without a cost. In some cases, users may need training to work with database query languages or graphical user interfaces. In effect, without the correct skilled personnel or necessary expertise, data becomes virtually useless to the users thereof.

Moreover, coordination and synchronization of data often keep data physically close to one or several homes or repositories. This necessitates the often undesirable condition that database experts be located physically near these few homes or repositories in order to perform maintenance and troubleshooting. This reality alone can cause a certain degree of inflexibility and inconvenience.

Online databases, such as those that are accessible in a wide variety over the Internet, are becoming increasingly common. With a few short keystrokes, immense amounts of information from all over the globe are accessible by the common individual. The emerging Internet is resulting in many time-saving advances making data available from virtually anywhere. However, while access to the data in these databases may be common, the ability to actually manage and manipulate the schema of such databases over networks, such as the Internet, is not. At present, the ability to manage and manipulate the data of a database, including the end user data and the schema of a database, through a network, such as the Internet, is very limited.

What is needed is a way for users to have access and control of the data, including the end user data and the schema of a database, irrespective of the type or origin of the database, through a network, such as the Internet.

What is further needed is a seamless and transparent way for users to manipulate the data, and even the schema of a database in a system that does not require a high level of expertise or training.

It would be an advance in the art to enable users to perform the foregoing functions remotely, such as through the Internet, with a common software package, such as a standard browser application. Such a system would allows users to view and modify the data and schema of a database on opposite ends of the globe if desired or needed. In addition, such a system would eliminate the necessity to load specialized database management software onto the computer or terminal of a user.

Moreover, it would be a further advance in the art to provide a system capable of recognizing and functioning with a wide variety of different databases in a manner that would be transparent to a user.

BRIEF SUMMARY AND OBJECTS OF THE INVENTION

In view of the foregoing, it is a primary object of the present invention to provide an apparatus and method to remotely access and modify the data and schema of a database, through a network such as the Internet, using nothing more than a simple browser application.

It is an object of the invention to provide a method whereby embedded coding within HTML web pages may be interpreted into SQL commands for communicating with any SQL compliant database.

It is a further object to provide all the utility of a typical database through a web-based interface.

It is a further object of the invention to provide an efficient method for maintaining and updating web sites using the utility of a database.

It is yet a further object of the invention to enable programming logic to be actually embedded within the code of a web page.

It is also an object to provide a manner whereby information is dynamically updated on a web page corresponding to changes in data in a database.

It is a further object to increase the flexibility of a database by allowing a browser, web-server, and database to be located on a single computer or on computers at opposite ends of the globe, if needed or desired.

Consistent with the foregoing objects, and in accordance with the invention as embodied and broadly described herein, a method and apparatus are disclosed in one embodiment of the present invention as including a computer having a browser, having a communication link established with a web server, and making a request thereto. The web server, upon receiving the request, may then forward the request to the service module of the present invention. The service module may be located on the same computer as the web server, or be hosted by an application server, in certain embodiments.

According to the level of access afforded to a user, a user may have the ability to view data from the database or, if more authority is granted, a user may actually have the ability to modify the data or schema of a database. In effect, a user may be able to manage a database remotely, using nothing more than a simple browser application. The database may be located on a server located remotely from the web server, connected by the Internet, or may be located on the same computer as the web server. In another embodiment, a browser, web server, service module, and database may all be hosted on the same computer.

The service module of the present invention may be configured to translate requests made to a web server into a database language necessary for communication with a database. In certain embodiments, the service module may be configured to communicate with any SQL compliant database.

Once a request is made to the service module and authority is granted to a user, the service module may then retrieve or change information contained within a database. Such information may include data, tables, forms, queries, reports, web pages, user profiles, or other data. In certain embodiments, web pages may be stored at one location in a database while data stored at another location may supply content to the web pages. Thus, the present invention provides an efficient apparatus and method for maintaining and updating web sites by dynamically retrieving data each time a web page is called by a browser.

In addition to retrieving data, the service module may also parse any data retrieved from the database and execute any logic found therein. Special tags may be included within the HTML coding of web pages, which may not be recognized by a typical browser, but may be understood by the service module of the present invention and may be used to execute instructions. For example, conditional statements may be included to forward a user to distinct web pages depending on the input entered by a user. Alternatively, an instruction programmed within the source code of a web page may be executed to actually retrieve data from a database to be inserted into the web page.

Once the data is retrieved and any logic found therein is executed, the result may be subsequently forwarded to the web server and on to the browser for viewing by a user. Thus, the service module may effectively act as an interface between a web server and a database.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 8, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Those of ordinary skill in the art will, of course, appreciate that various modifications to the details illustrated in the schematic diagrams of FIGS. 1–8 may easily be made without departing from the essential characteristics of the invention. Thus, the following description is intended only as an example, and simply illustrates one presently preferred embodiment consistent with the invention as claimed herein.

Figure 1:
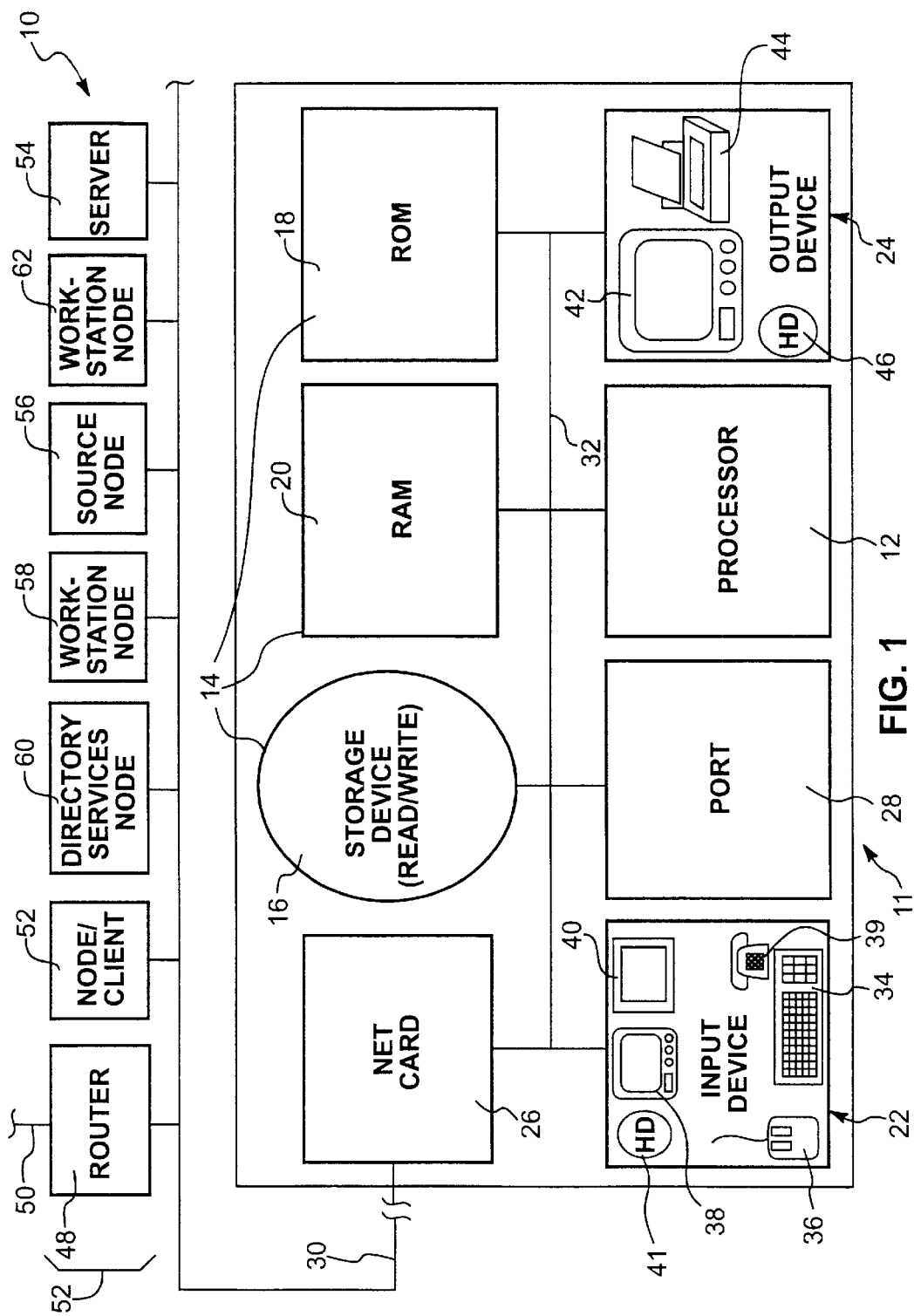
FIG. 1 is a schematic block diagram of one architecture for a hardware suite suitable for implementing an apparatus in accordance with the present invention.

Referring now to FIG. 1, an apparatus 10 may include a node 11 (client 11, computer 11) containing a processor 12 or CPU 12. The CPU 12 may be operably connected to a memory device 14. A memory device 14 may include one or more devices such as a hard drive 16 or non-volatile storage device 16, a read-only memory 18 (ROM), and a random-access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 (system bus 32) may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like.

Similarly, a scanner 40 may be used to receive graphical inputs which may or may not be translated to other character formats. A hard drive 41 or other memory device 14 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11,52 on an internetwork. The individual nodes 52 may have various communication capabilities.

In certain embodiments, a minimum of logical capability may be available in any node 52. Note that any of the individual nodes 52 may be referred to, as may all together, as a node 52 or nodes 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components of the apparatus 10 may need to communicate data with one another. A communication link may exist, in general, between any pair of devices or components.

By the expression "nodes" 52 is meant any one or all of the nodes 48, 52, 54, 56, 58, 60, 62, 11. Thus, any one of the nodes 52 may include any or all of the component parts illustrated in the node 11. The node 60 hosts the software and data structures required for providing directory services to the nodes 52 in the network 30 and may do so for other nodes 52 in other networks 50. The node 60 may typically be a server 54 in a network. However, it may be installed in any node 52. A node 52 may typically include a network card 26 for connecting to the network 30, a processor 12 for processing software commands, a memory device 20 for operational memory as well as a non-volatile storage device 16 such as a hard drive 16. Typically, an input device 22 and an output device 24 are provided for user interaction with the node 60.

Figure 2:
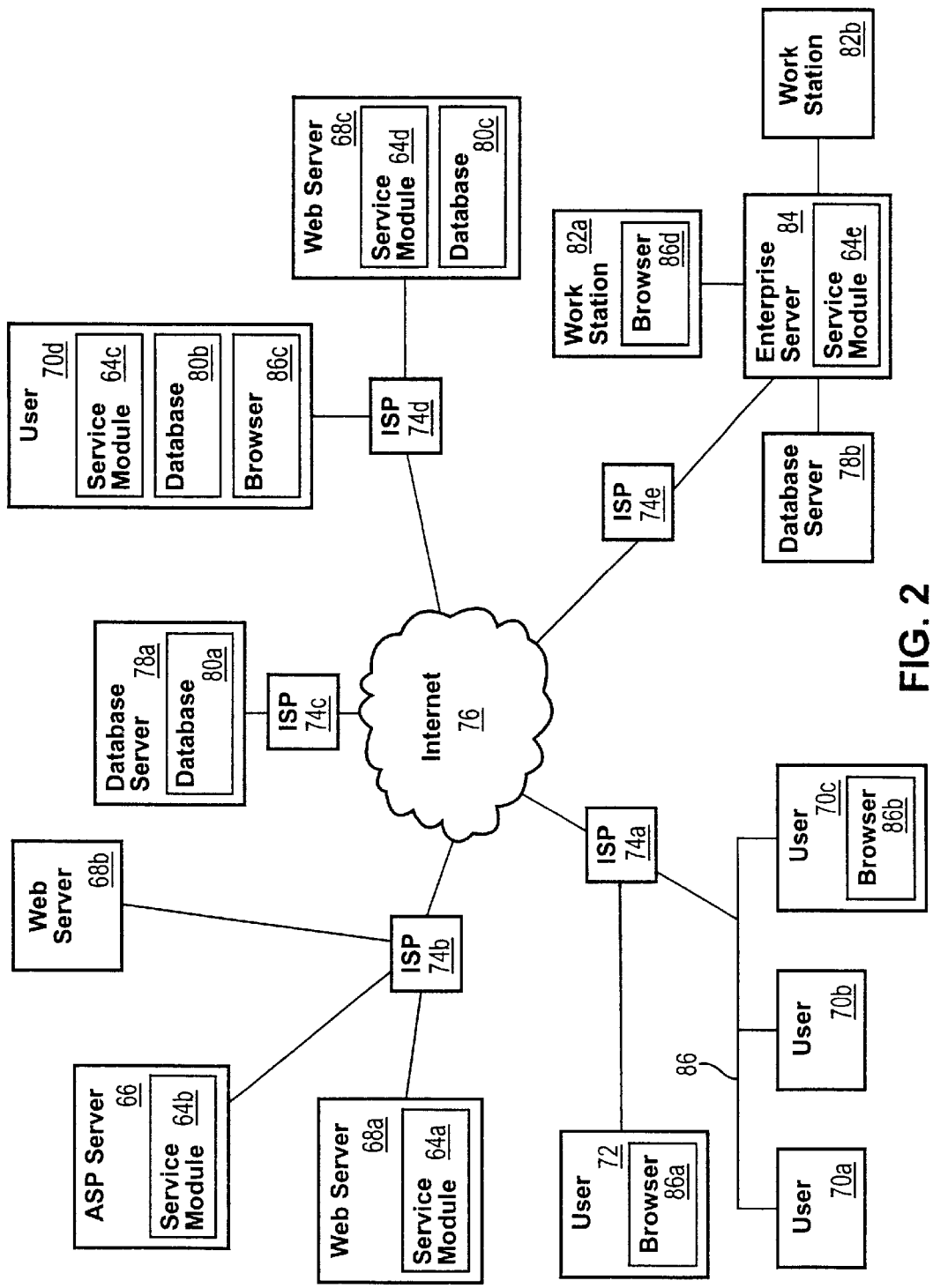
FIG. 2 is a schematic block diagram illustrating various possible implementations of the present invention.

Referring to FIG. 2, while continuing to refer to FIG. 1, in general, any number of workstation nodes 58, 62 may exist in a network 30, within some practical limit. Any network 30, 50 may be part of, and connect to the Internet 76. In certain embodiments a user may be connected to the Internet 76 through an Internet service provider 74a. The user 72 may be any computer system, such as system 11 in FIG. 1, having a browser 86a. The user 72 may be configured to communicate with a web server 68a that is configured to provide web pages that are stored in the memory of the web server 68a and are viewable by a user 72. A service module 64a may also be located in the memory of the web server by 68a and may comprise executable and operational data structures configured to be processed in the processor of the web server 68a.

When a request for a web page is made by a browser 86a to a web server 68a, the service module 64a may be configured to retrieve the web page data from a location in a database 80a on a remotely located database server, such as server 78a.

In addition, the service module 64a may actually process programming embedded within the HTML coding of web pages located on the database server 78a. The programming may comprise executable logic that may dynamically retrieve data within another location in the database 80a to provide content to the web page. Such-executable logic may be coded in a language understandable by the service module 64a of the present invention. The logic may be embedded within special tags contained in the HTML-encoded page. These special tags are typically configured to be ignored by the typical browser, but these special tags configured to be understood and executed by the service module 64a of the present invention.

In certain instances, the executable logic may comprise conditional statements that may be executed in response to user input. For example, coding may be included within a web page to process conditional "if" statements, such as when receiving a password from a user. In this example, if a user types the incorrect password, the coding within the web page may be configured to deny a user access and/or may forward the user to another specific web page. Additionally, input by a user through the browser 86a may be processed by the service module 64a to modify the data and/or even the schema of the database 80a.

Thus, in the depicted configuration, a user 72, web server 68a, and database server 78a, may be connected to the Internet 76 to function in accordance with the invention while being physically located at geographically distant locations around the Earth.

In reality, a user need not be a single user 72, but may actually be any user connected to the Internet 76, such as a plurality of users 70a–c connected by a local area network (LAN) 86. Any user 70c, such as users 70a, 70b, 70c, and 72, having a browser 86b, such as browsers 86a, 86b, and 86c, with Internet access may access the web server 68a and the database 80a.

In another embodiment, the service module 64b may actually be located on an ASP (application service provider) server 66. Therefore, a web server 68b may forward a request to a service module 64b located on ASP server 66. In turn, the service module 64b may retrieve or modify data and/or schema in a database 80a on a server 78a. In the depicted embodiment, the application server 66 may be configured to provide to a plurality of businesses or individuals the services of the service module 64b. Thus, in the depicted configuration, any need to install the service module 64b on one or more web server(s) may be avoided.

In certain embodiments, the service module 64c, database 80b, and browser 86c may all be located on a computer of a single user 70d.

In another embodiment, a service module 64d and database 80c may both be located on the web server 68c and may be accessed by any user 72 and/or group of users 70a–c connected to the Internet.

In yet another embodiment, a service module 64e may be located on an enterprise server 84 connected to a database server 78b. A plurality of workstations 82a, 82b, each having thereon a browser 84d and each in operable communication with the enterprise server 84, may access the database server 78b through the server 84.

Thus, the foregoing descriptions illustrate the versatility of the present invention and the various embodiments in which it may be implemented. The present invention as illustrated may be employed according to needs of a particular user or users. Hence, the data, including end user data and schema, of a remotely located database may be modified with the only client software being a simple browser application.

Figure 3:
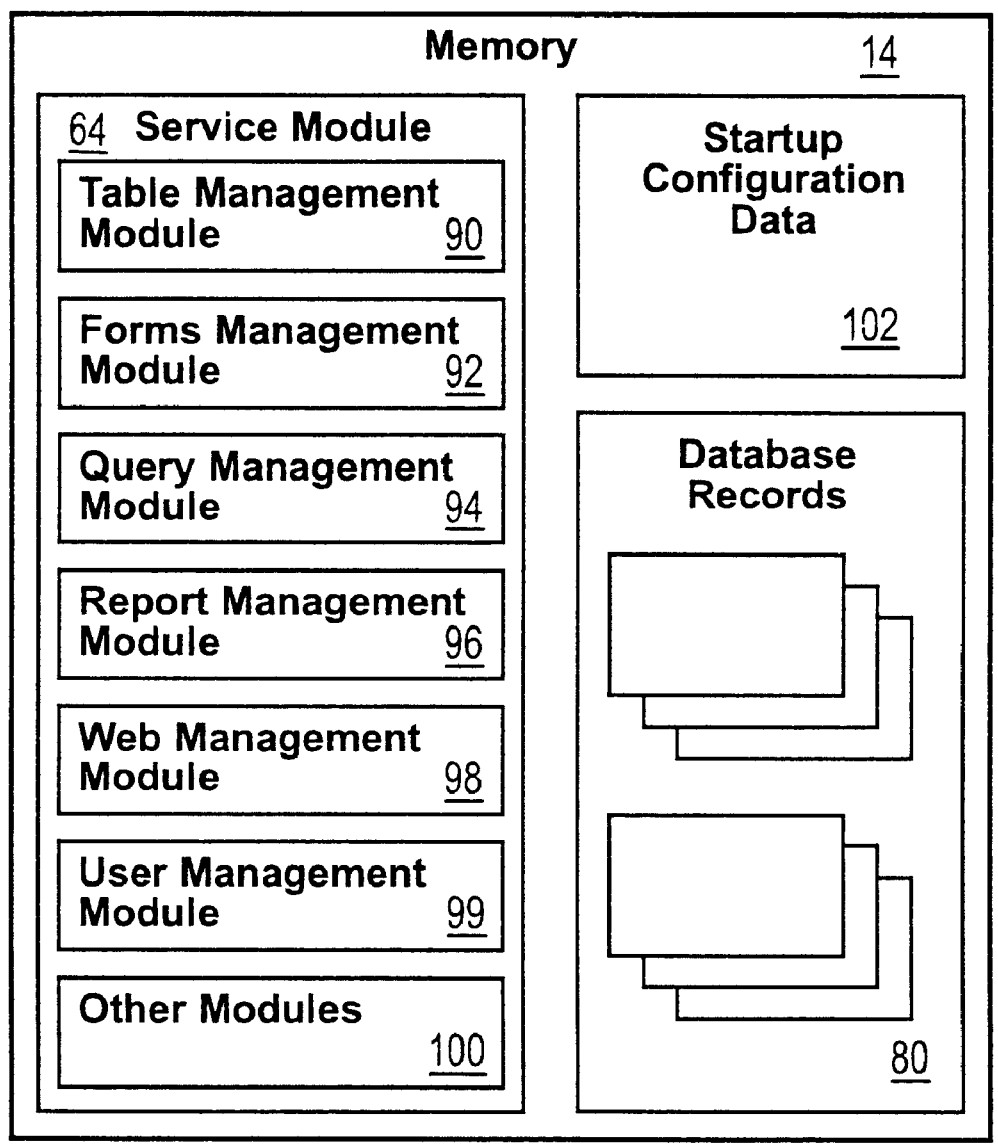
FIG. 3 is a schematic block diagram of the service module, startup configuration data, and database records contained within memory in accordance with the invention.

Referring to FIG. 3, in one embodiment, a memory device 14 in a computer 11, which computer 11 may be disposed in any of the configurations discussed in connection with FIG. 2, may include a service module 64 comprising a table management module 90, a forms management module 92, a query management module 94, a report management module 96, a web management module 98, a user management module 99, and other modules 100. A memory device 14 may also store startup and configuration data 102 used to initiate the service module 64. Additionally, a memory device 14 may actually store a database 80, which may comprise records or tables populated with data.

Typically, a database stores information within some type of a schema, such as records or tables. A table management module 90, therefore, may be used in accordance with the present invention to manage the schema, typically embodied as tables, of one or more databases(s). Such tables will be explained in further detail in the description of FIG. 4. The table management module 90 may enable a user and/or several users to alter the schema or structure of a database, if desired.

Forms provide a convenient and graphical way for a user to populate a database with data. Data entry may be simplified by providing a user with graphical boxes or areas where data may be input. Consequently, a forms management module 92 may be included with the present invention to design and manage forms to be used for data input.

One of the major advantages of databases is the ability to search the data contained therein according to specific criteria. Such searches may also be called queries and represent the communication that occurs between a database engine and a database. Most databases typically use a standard query language. The present invention may include a query management module 94 to manage any queries of a database.

It also may be useful for a user of a database to be able to process reports of the data contained within a database. Such reports may allow a user to compare, view, and analyze specific data within the database. Consequently, a report management module 98 may be included in the service module 64 to manage such database reports.

With the continued growth of the Internet, the ability to access the data, including without limitation end user data and database schema, of a database through the Internet is becoming an important feature to many users. A web management module 98 may be included with the present invention wherein web pages may be more easily managed. The web management module 98 may be used to create web pages whose content may be dynamically updated as data in the database changes. This ability to dynamically update the content of web pages may provide a tremendous time savings by eliminating much of the programming required to update content in static web pages.

A user management module 99 may also be included with the present invention to control users' access to a database and to control the level of access granted thereto. For example, some users may be granted access only to view data, whereas other users may be granted privileges to access and modify not only the data of a database, but also the schema. The level of access and privileges may be customized according to the individual user. Such a feature may provide a needed level of security to control access to a database granted to some users while still providing an increased level of access to other users.

In addition, other modules 100 may be included in the service module 64 as needed to provide additional functions.

Figure 4:
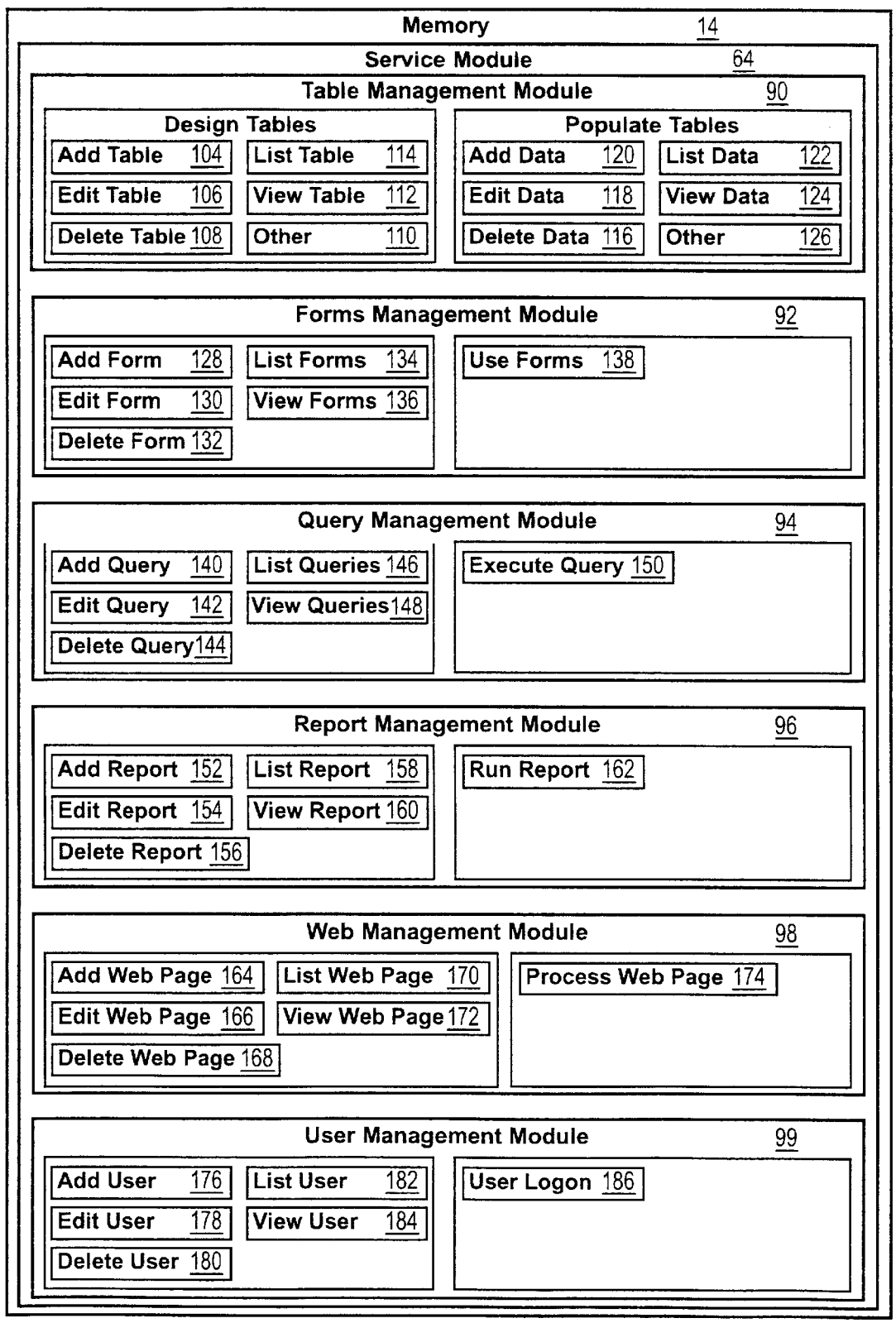
FIG. 4 is a schematic block diagram of various functions performed by the service module of the present invention.

Referring to FIG. 4, A service module 64 of the present invention may include a table management module 90 providing the ability to alter the schema or structure of a database. For example, a user may be able to add 104, edit 106, or delete 108 tables according to the configuration required of a database. Likewise, a user may be able to list 110 existing tables within a database or view 112 the data contents of a table. Accordingly, other functions 114 or tools 114 that may provide a user the ability to modify, view, or work with tables in a database may be provided in the table management module 90 of the present invention.

In addition, the table management module 90 may allow a user to populate a table with data. For example, a user may add 116, edit 118, or delete 120 fields within each table.

Likewise a user may list 122, search 126, or view 124 data within a table. Other tools 126 or functions 126 may also be provided as needed to work with the data in a database.

The forms management module 92 may be included within the service module 64 of the present invention to enable a user to design and work with forms. A user may choose to design a form or actually use the form to input data to a database. For example, a user may choose to add 128, edit 130, or delete 132 a form. In addition, a user may choose to list 134 existing forms or view 136 a particular form. Once a form is created, it may then be used 138 to add 120, edit 118, or delete 116 data.

Likewise, a query management module 94 may be included with the present invention to create and execute queries. A query may be added 128, edited 130, or deleted 132. Likewise a query management module 94 may be used to list 146 queries or view a particular query 148. Once a query is created, it may be executed 150 in order to search a database based on chosen criteria.

A report management module 96 may also be included in the service module 64 of the present invention to create and run reports. Like the previous modules discussed, reports may be added 152, edited 154, or deleted 156. In addition, reports that have been created may be listed 158 or a particular report may be viewed 160. Once a report has been created, it may be run 162 whereby the data is actually retrieved from a database to populate the report with data.

A web management module 98 may be included in the present invention to allow a user to create web pages. The present invention offers the advantage of allowing the design of web pages that may be dynamically updated, thus saving time that might be lost reprogramming static pages. Logic may be added within an HTML encoded web page that is understandable by the service module 64 that will actually retrieve the current data contents of a location in a database to provide content to a web page. Thus, a web page may be updated simply by changing the data in the database to which it refers. In addition programming logic may be embedded in the HTML coding that may be executed in accordance with the present invention.

The web management module 98 may provide a user the ability to add 164, edit 166, or delete 168 web pages. In addition a user may be able to list 170 existing web pages or view 172 a particular web page. Once a web page is created, it may be processed, upon viewing by a user, wherein data is retrieved from a database to provide web page content and any logic contained therein is executed.

The service module 64 may also include a user management module 99 provided to manage levels of access granted to users registered therein. In certain embodiments, any anonymous user may be allowed to view data, while only certain users may be granted the authority to actually alter the data or schema of a database. The user management module 99 may allow the adding 176 or deleting 180 of a user by a user with administrative authority. Likewise, a user profile may be edited 178 such as when changing the level of access or authority of a particular user. Additionally the module 99 may allow a user or administrator to view a list of registered users or view the profile of a particular user.

In certain embodiments, once a user is added, a user may actually gain access to a database by entering a particular user ID and password.

In addition to the modules illustrated in the foregoing description, the present invention may make use of other modules as additional functions are needed. Like the other modules, the criteria may be added, edited, deleted, listed, viewed, or processed in accordance with the invention.

Figure 5:
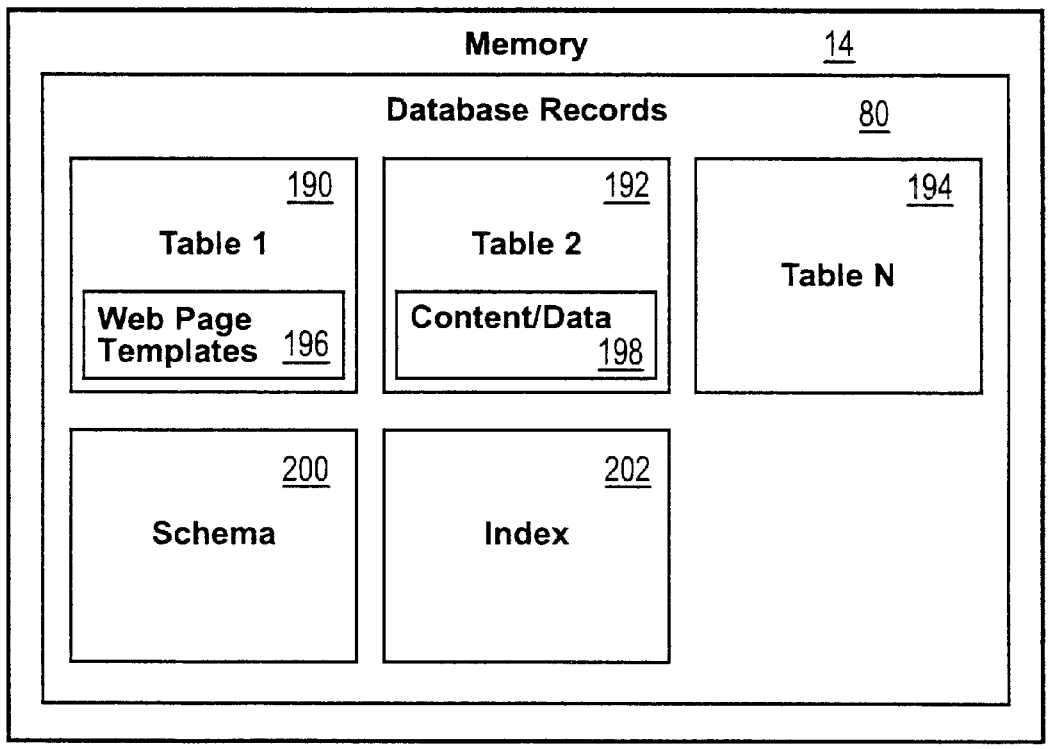
FIG. 5 is a schematic block diagram of one embodiment of database records accessed by the service module of the present invention.

Referring to FIG. 5, in one embodiment, a database 80 contained in memory 14 may be comprised of a plurality of tables 190, 192, 194. Some of the tables may contain data while other tables may contain schema 200 information or indices 202 of the other tables 190, 192, 194.

For example, in one embodiment, a table 190 may contain web page templates 196, while another table 192 may contain the content 198 or data 198 used in the web page templates 196. Upon viewing a web page 196 contained within the table 190, coding embedded with the web pages 196 may contain instructions to pull data 198 or content 198 from the table 192. In HTML web page source code, which is typically coded with "special tags." Such special tags may be used in accordance with the present invention to interact with executable and often embedded logic. Such logic may either be instructions to retrieve data as previously stated or may contain other executable instructions.

Users with proper authority may be able to alter the schema 200 of the database 80, such alteration of the schema 200 may include adding, editing, or deleting any of the tables 190, 192, 194 or any other function that may alter the structure or architecture of the database. Since it may not be desirable that arbitrary users have access to alter the schema of the database, this privilege may be reserved for authorized users only.

In general, typical database systems that are presently accessible over the Internet may allow access to the data in a database 80, but such database systems have no mechanism for allowing the modification of the schema 200 of a database 80 across the Internet using only a browser application. The ability to modify the schema 200 of a database 80 across the Internet using only a browser application is an advantage that is provided by the present invention.

Figure 6:
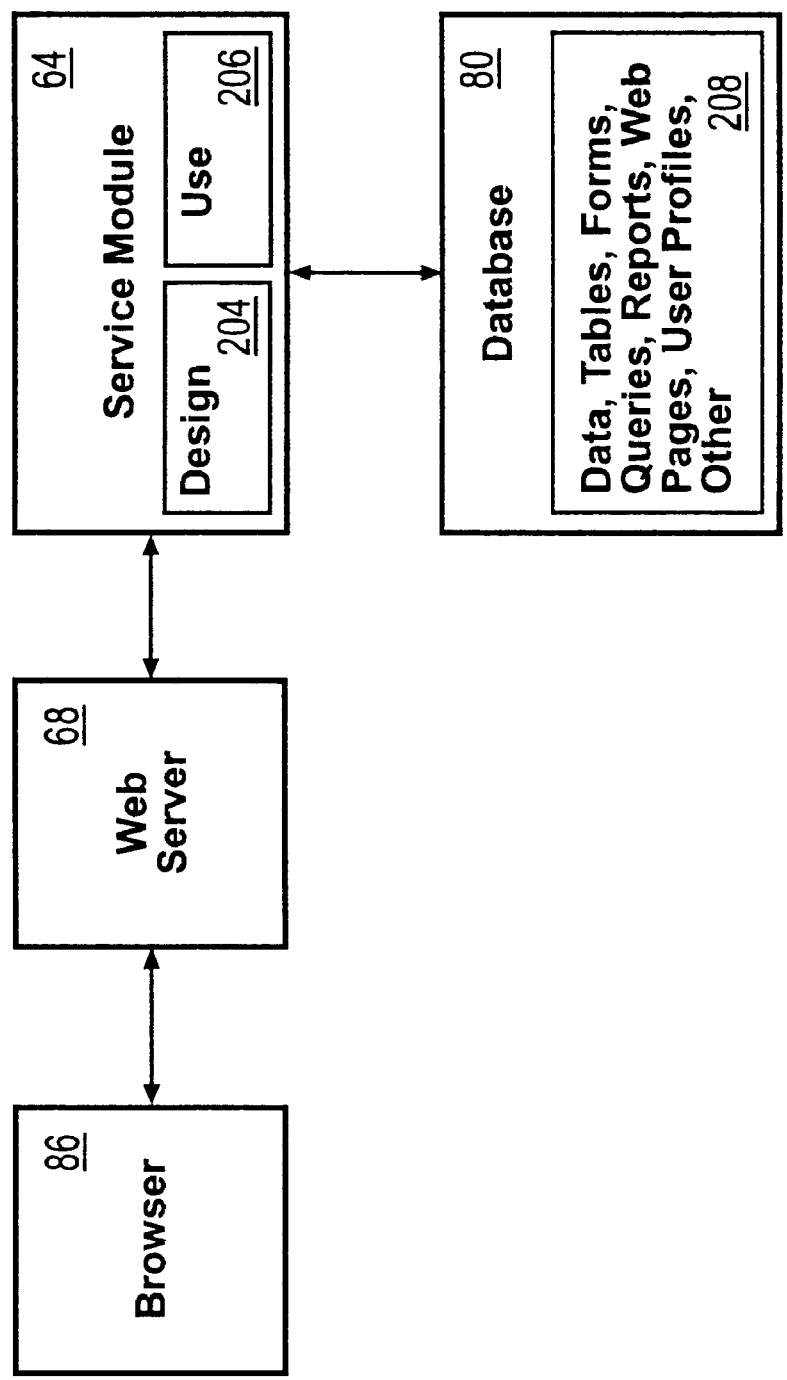
FIG. 6 is a schematic block diagram illustrating the flow of communication performed by the present invention.

Referring to FIG. 6, a flow chart showing the flow of communication in accordance with the present invention is illustrated. A browser 86, having a communication link established with a web server 68, may make a request therefrom. This request may subsequently be forwarded to the service module 64 of the present invention. According to the level of access afforded to a user, a user may be granted the ability to view 206 or use 206 data from the database 80 or, if more authority is granted, a user may actually have the ability to design 204 or change 204 the data or schema of a database 80. The service module 64 may translate the request from the web server 68 into any database language necessary for communication with the database. In certain embodiments, the service module 64 may be configured to communicate with any SQL compliant database.

Once the request is made to the service module 64 and authority is granted to a user, the service module 64 may then retrieve or change information contained within the database 80. Such information may include data, tables, forms, queries, reports, web pages, user profiles, or other data. In addition to retrieving data, the service module 64 may also parse any data from the database 80 and execute any logic found therein.

Once the data is retrieved and any logic found therein is executed, a result may be subsequently determined by the service module 64. Accordingly, the result may then be forwarded to the web server 68 and on to the browser 86 for viewing by a user. Thus, the service module 64 effectively acts as an interface between a web server 68 and a database 80.

Figure 7:
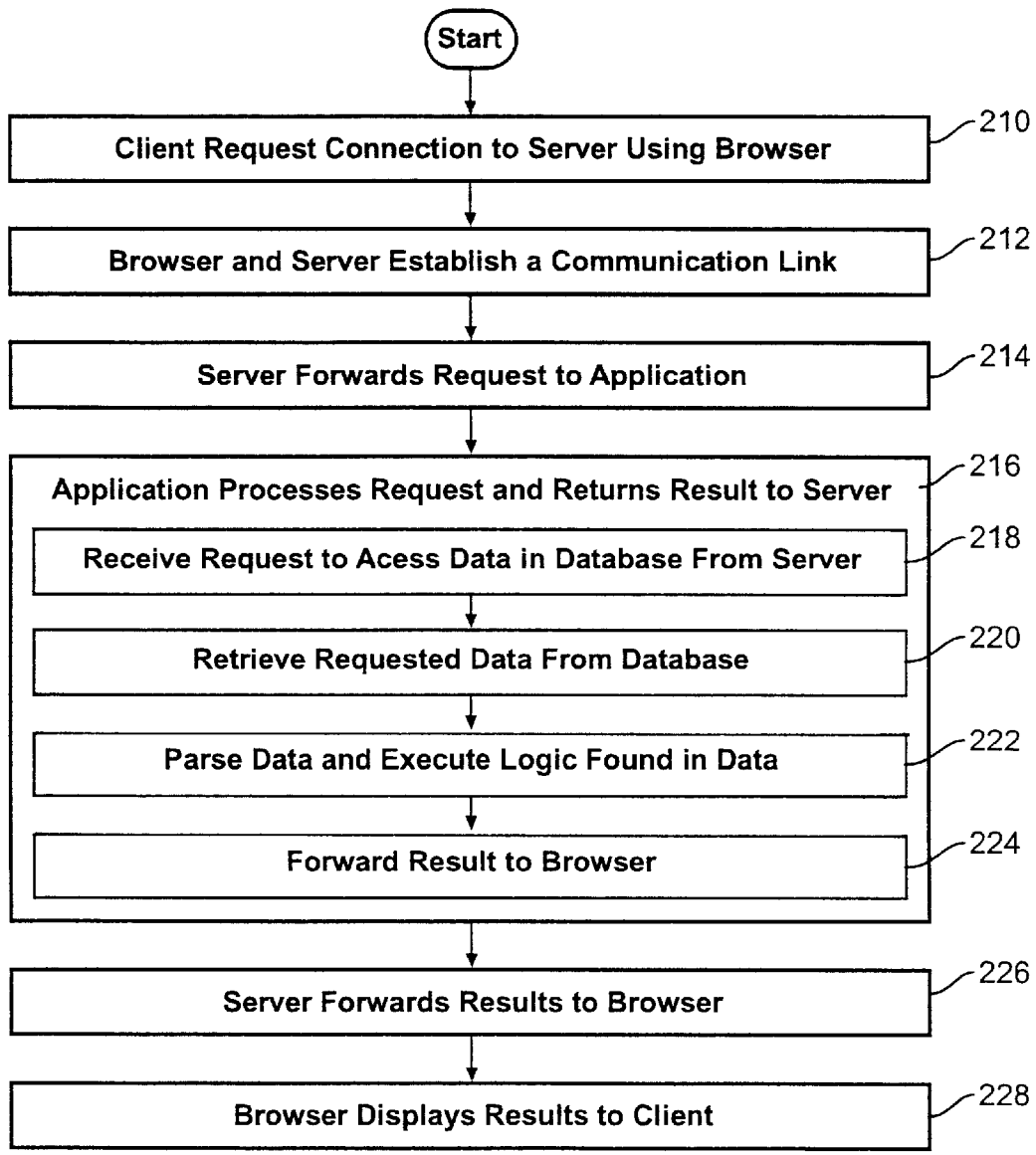
FIG. 7 is flow chart showing the sequence of steps performed by the present invention when an anonymous request is made.

Referring to FIG. 7, a process is illustrated whereby an anonymous request 210 is received by a browser in accordance with the present invention. Upon receiving the request 210, a browser and server establish a communication link 212. Once the communication link is established, the server then forwards the request 214 to the service module 64 or application 64 of the present invention.

The application 64 or service module 64 may then process the request and return the result to the server 216. Processing the request includes receiving a request to access data in a database from the server. Once the request is received, the requested data is then retrieved from the database. The service module 64 or application 64 may then parse any data retrieved and execute any logic found therein 222, creating a result. The result is subsequently forwarded to the server.

Once the result is received by the server, the result may then be forwarded to the browser 226 where it may be displayed to a user 228.

Figure 8:
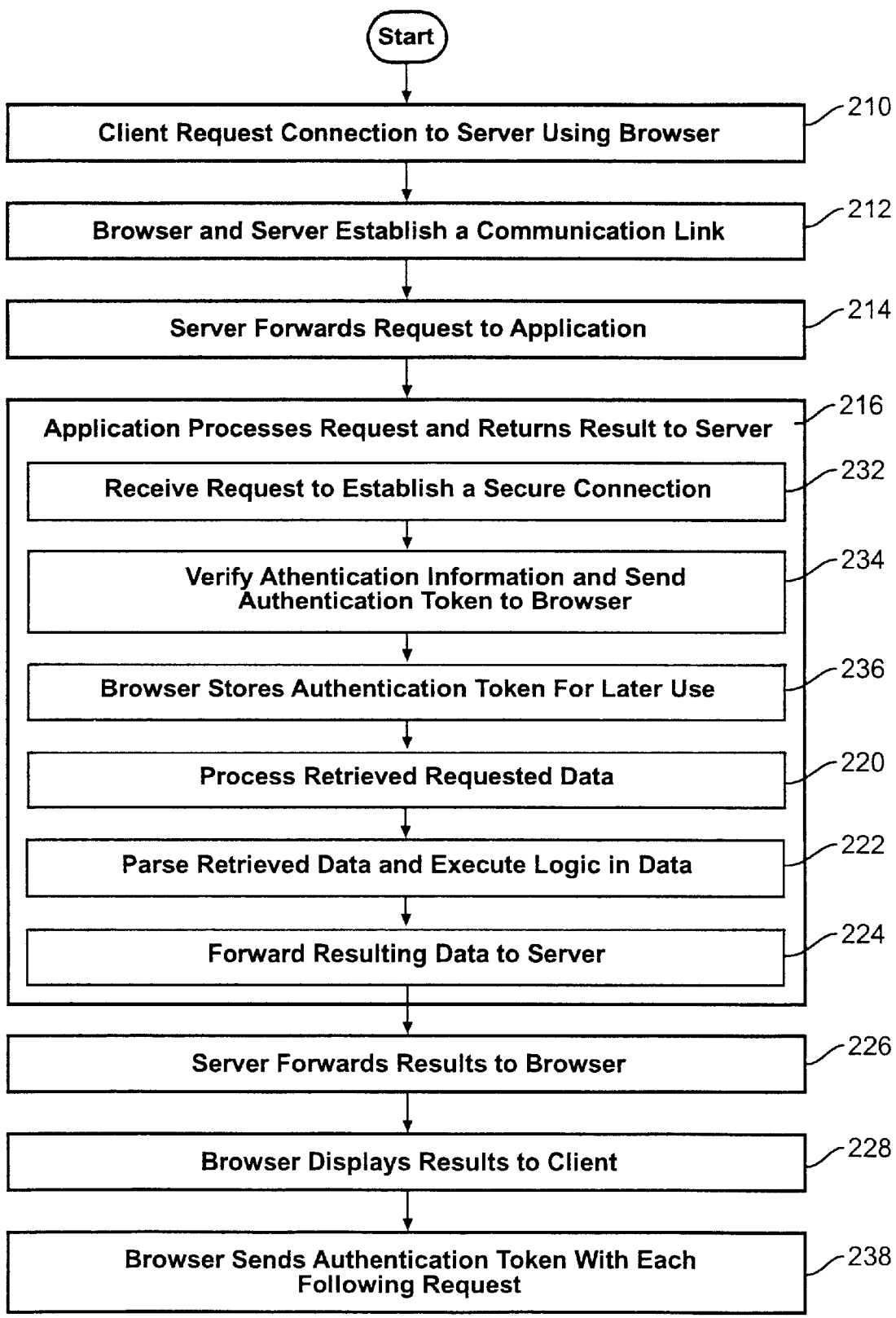
FIG. 8 is flow chart showing the sequence of steps performed by the present invention when a secure request is made.

Referring to FIG. 8, a flow chart is illustrated wherein a secure connection is requested by a client through a browser. As described in FIG. 7, a browser and server must first establish a communication link 212. Once the communication link is established, the server may then forward the request 214 to the service module 64 or application 64.

The application may then process the request and return the result to the server 216. The steps for processing a secure request by the application 216 include, first, receiving the request to establish a secure connection 232. The service module 64 or application 64 may then verify authentication information and send an authentication token to the browser 234. The browser may then store the authentication token for later use 236. Once the token is received, the service module 64 may then process the request by retrieving the data 220, parsing the retrieved data and executing any logic in the data 222, and forwarding the result to the server 224.

Once the server receives the result, the result may then be forwarded to the browser 226 where the it may be displayed for a user 228. In certain embodiments, once a secure connection is established, the browser may send the authentication token to the server with each following request. In certain embodiments, the authentication token may be a cookie placed on a user's computer.

From the above discussion, it will be appreciated that the present invention provides an effective browser-based database access engine that may be used across the Internet.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for using a database through a web-based interface, the apparatus comprising:

a processor configured to execute executable data structures; and a memory device connected to the processor for storing the executable data structures and associated operational data structures, the executable and operational data structures comprising:

a database server configured to host a database comprising schema and records containing data;

a web server, comprising a file system and configured to receive requests for files from and publish selected files in response to a browser in operable communication therewith;

a service module configured to store and retrieve web page templates comprising source code, stored as first records in the database, and content corresponding to the web page templates, stored as second records, wherein the service module is further configured to execute embedded logic within the source code to enable the web page templates to be dynamically updated with the content; and the service module further configured to publish the web page templates and corresponding content to at least one of the web server and the browser.

2. The apparatus of claim 1, wherein the service module is further configured to directly view and modify the data and schema of the database in accordance with instructions received from the user.

3. The apparatus of claim 2, wherein the service module is configured to receive the instructions directly from the browser.

4. The apparatus of claim 2, wherein the service module is configured to receive the instructions from the browser through the web server.

5. The apparatus of claim 4, wherein the service module is further configured to provide user management of a plurality of users by providing each user an arbitrary level of access and control of the data and schema.

6. The apparatus of claim 5, wherein the service module interprets the embedded logic in the web pages into a database language for communicating with the database.

7. The apparatus of claim 6, wherein the service module is further configured to execute instructions within the source code to provide programming functions to the web pages.

8. The apparatus of claim 7, wherein the database is selected from the group consisting of a relational database and an object-oriented database.

9. The apparatus of claim 1, wherein the service module is further configured to provide user management of a plurality of users by providing each user an arbitrary level of access and control of the data and schema.

10. The apparatus of claim 1, wherein the web pages comprise source code and the service module is further configured to execute embedded logic within the source code to enable the web pages to be dynamically updated with the content in the database.

11. The apparatus of claim 10, wherein the service module interprets the embedded logic in the web pages into a database language for communicating with the database.

12. The apparatus of claim 1, wherein the web pages comprise source code, and the service module is further configured to execute embedded logic within the source code to provide programming functions to the web pages.

13. The apparatus of claim 1, wherein the database is selected from the group consisting of a relational database and an object-oriented database.

14. The apparatus of claim 1, wherein the service module is further configured to directly view and modify the data and schema of the database in accordance with instructions received from the user directly from the browser.

15. The apparatus of claim 1, wherein the service module is further configured to directly view and modify the data and schema of the database in accordance with instructions received from the browser through the web server.

16. A method for viewing web pages stored in a database, the method comprising:

establishing a communication link between a browser and a web server, wherein a user makes a request through the browser to the web server to view web pages located in a database;

forwarding the request from the web server for processing by a service module;

receiving, by the service module, the request from the web server;

retrieving, by the service module, the web page from the database corresponding to the request, the web page template comprising source code;

parsing, by the service module, the web page template and executing any logic found therein, the logic being effective to dynamically populate the web page template with content in the database;

forwarding the result from the service module to the web server; and forwarding the result from the web server to the browser.

17. The apparatus of claim 16, wherein the database is selected from the group consisting of a relational database and an object-oriented database.

18. A method for manipulating the schema of a database through a web-based interface, the method comprising:

establishing a communication link between a browser and a web server, wherein a user makes a request through the browser to the web server to manipulate the schema of a database;

forwarding the request from the web server for processing by a service module;

determining, by the service module, the level of access granted to the user;

permitting, by the service module, the user to modify the schema of the database corresponding to the level of access granted thereto;

receiving, by the service module, the request from the web server;

modifying, by the service module, the schema of the database corresponding to the request;

forwarding a result from the service module to the web server; and forwarding the result from the web server to the browser.

19. The apparatus of claim 18, wherein the database is selected from the group consisting of a relational database and an object-oriented database.

* * * * *

UNITED STATES PATENT AND TRADEMARK OFFICE
CERTIFICATE OF CORRECTION

PATENT NO.   : 6,460,041 B2
DATED        : October 1, 2002
INVENTOR(S)  : Steven D. Lloyd It is certified that error appears in the above-identified patent and that said Letters Patent is hereby corrected as shown below:

<u>Title page,</u>
Item [57], ABSTRACT,
Lines 4 and 11, please delete "system", and insert therefore -- invention --.

<u>Column 12,</u>
Line 17, please delete "the" (second occurrence), and insert therefore -- a --.
Line 17, after "page", please insert -- template --.

Signed and Sealed this

Fifteenth Day of July, 2003

JAMES E. ROGAN
*Director of the United States Patent and Trademark Office*